(12) United States Patent
Lu et al.

(10) Patent No.: US 9,781,674 B2
(45) Date of Patent: Oct. 3, 2017

(54) COMMUNICATION DEVICE AND COMMUNICATIONS METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Xin Lu, Shenzhen (CN); Fei Wang, Shenzhen (CN); Dan Cao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 91 days.

(21) Appl. No.: 14/697,827

(22) Filed: Apr. 28, 2015

(65) Prior Publication Data

US 2015/0312859 A1 Oct. 29, 2015

(30) Foreign Application Priority Data

Apr. 29, 2014 (CN) .......................... 2014 1 0175087

(51) Int. Cl.
*H04W 52/02* (2009.01)
*H04W 84/20* (2009.01)
(52) U.S. Cl.
CPC ....... *H04W 52/0235* (2013.01); *H04W 84/20* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 2009/0047982 A1* | 2/2009 | Shi | .......................... | H04W 4/02 455/466 |
| 2011/0077031 A1* | 3/2011 | Kim | ..................... | H04B 1/3816 455/458 |
| 2011/0269503 A1* | 11/2011 | Park | ...................... | H04W 8/183 455/552.1 |
| 2012/0108294 A1* | 5/2012 | Kaul | .................... | G06K 7/0013 455/558 |
| 2014/0207895 A1* | 7/2014 | Otsuka | .................. | H04W 8/005 709/208 |
| 2015/0245186 A1* | 8/2015 | Park | ....................... | H04W 4/16 455/417 |
| 2015/0245197 A1* | 8/2015 | Lee | ....................... | H04W 8/205 455/418 |

\* cited by examiner

*Primary Examiner* — Paul H Masur
*Assistant Examiner* — Michael Phillips
(74) *Attorney, Agent, or Firm* — Steven Reiss

(57) ABSTRACT

An communications method for intercommunication by multiple electronic devices includes determining an on or off status of a first communication device, the first communication device being given master status if turned on and being used, and other devices being given slave status. If one other device is then used in preference to the first communication device, the other device is appointed as master and all other devices which are turned on are appointed as slaves. According to current state of the first communication device, the first communication device is turned off if not being used.

2 Claims, 11 Drawing Sheets

COMMUNICATION DEVICE AND COMMUNICATIONS METHOD

CROSS-REFERENCE TO RELATED APPLICATIONS

This application claims priority to Chinese Patent Application No. 201410175087.6 filed on Apr. 29, 2014, the contents of which are incorporated by reference herein.

FIELD

The subject matter herein generally relates to communications technology, and particularly to, a communication device and a communications method.

BACKGROUND

A user can own more than one communication devices, such as a mobile phone, a tablet computer, and a smart wristwatch. The tablet computer and the smart wristwatch both have communication function. Generally, each of these communication devices has a unique communication number. Moreover, the user may prefer to use different communication devices in different places and at different times, for example, to use the tablet computer when at home, to use the mobile phone at office, and to use the smart wristwatch when taking exercise.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure.

Moreover, in the drawings, like reference numerals designate corresponding parts throughout the several views.

DETAILED DESCRIPTION

Figure 1:
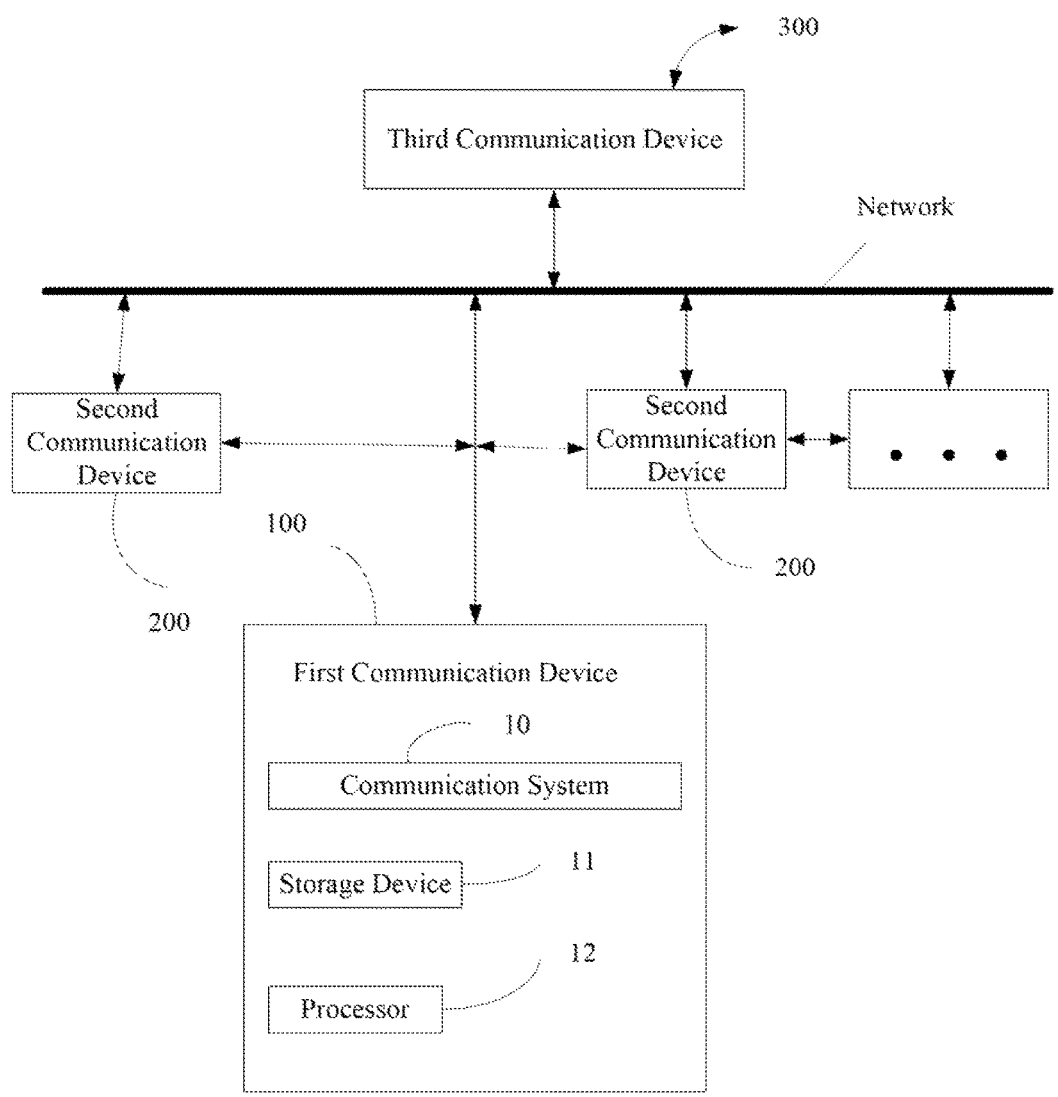
FIG. 1 is a block diagram of an embodiment of a hardware environment for executing a communication system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to " an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

FIG. 1 illustrates a block diagram of an embodiment of a hardware environment for executing a communication system. In at least one embodiment as shown in FIG. 1, the communication system 10 can be installed and run on a first communication device 100. The communication system 10 can also be installed and run on a second communication device 200. In the embodiment, a single communication number such as one telephone number is assigned to both the first communication device 100 and the second communication device 200. The first communication device 100 can communicate with the second communication device 200. Moreover, both the first communication device 100 and the second communication device 200 can communicate with a third communication device 300, which has a different communication number, through a network. The first communication device 100 and the second communication device 200 can be tablet computers, notebook computers, smart phones, personal digital assistants (PDA), or other suitable electronic devices that have communication function. FIG. 1 illustrates only one example of the communication devices that can include more or fewer components than as illustrated, or have a different configuration of the various components in other embodiments. In at least the one embodiment as shown in FIG. 1, the first communication device 100 includes, but is not limited to, a communication system 10, a storage device 11, and at least one processor 12. In another embodiment, the first communication device 100 and the second communication device 200 have the same components.

In at least one embodiment, the storage device 11 can include various types of non-transitory computer-readable storage mediums. For example, the storage device 11 can be an internal storage system, such as a flash memory, a random access memory (RAM) for temporary storage of information, and/or a read-only memory (ROM) for permanent storage of information. The storage device 11 can also be an external storage system, such as a hard disk, a storage card, or a data storage medium. The at least one processor 12 can be a central processing unit (CPU), a microprocessor, or other data processor chip that performs functions of the communication system 10 in the first communication device 100.

Figure 2:
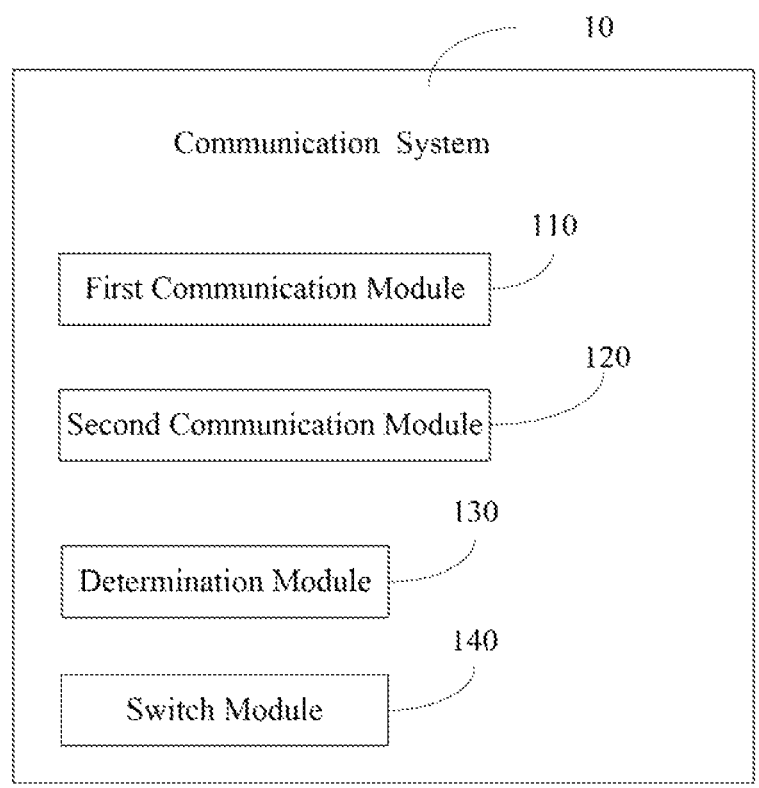
FIG. 2 is a block diagram of a first embodiment of function modules of the communication system in FIG. 1.

FIG. 2 is a block diagram of a first embodiment of function modules of the communication system 10. In at least one embodiment, the communication system 10 can include a first communication module 110, a second communication module 120, a determination module 130, and a switch module 140. The function modules 110-140 can include computerized codes in the form of one or more programs which are stored in the storage device 11. The at least one processor 12 executes the computerized codes to provide functions of the function modules 110-140.

The first communication module 110 can establish communication between the first communication device 100 and the third communication device 300 such as making calls or sending messages. The first communication module 110 has a turned-off state and a turned-on state. When the first communication module 110 is in the turned-off state, the first communication device 100 cannot communicate with the third communication device 300. When the first communication module 110 is in the turned-on state, the first communication device 100 can communicate with the third communication device 300 through the first communication module 110 via wireless network, such as via Global System for Mobile communications (GSM), 2G wireless technology, 3G wireless technology, 4G wireless technology, Code-Division Multiple Access (CDMA), Wideband Code Division Multiple Access (WCDMA), for example. That is, the first communication module 110 can be an element selected from the group consisting of a Global System for Mobile communications (GSM) module, a 2G wireless technology module, a 3G wireless technology module, a 4G wireless technology module, a Code-Division Multiple Access (CDMA) module, and a Wideband Code Division Multiple Access (WCDMA) module.

The second communication module 120 can establish communication between the first communication device 100 and the second communication device 200, for example, sending messages. In at least one embodiment, the first communication device 100 and the second communication device 200 communicate with each other through the second communication module 120 via a wireless technology, such as via BLUETOOTH, WIFI, IR, GSM, 2G wireless technology, 3G wireless technology, 4G wireless technology, CDMA, and WCDMA, for example. That is, the second communication module 120 can be an element selected from the group consisting of a GSM module, a 2G wireless technology module, a 3G wireless technology module, a 4G wireless technology module, a CDMA module, and a WCDMA module.

The determination module 130 can determine a current state of the first communication device 100 by determining whether the first communication device 100 is currently being used. In the embodiment, the determination module 130 can detect users' operations applied on the first communication device 100, such as unlocking the touch screen of the first communication device 100, taking telephone calls using the first communication device 100, and playing games in the first communication device 100, for example. When at least one operation is currently detected on the first communication device 100, the determination module 130 determines the current state of the first communication device 100 as being in use.

The switch module 140 can turn on or turn off the first communication module 110 of the first communication device 100 according to current state of the first communication device 100. Specifically, when the determination module 130 determines that the first communication device 100 is currently being used, the switch module 140 turns on the first communication module 110, and transmits a control signal to the second communication device 200 through the second communication module 120, to turn off the first communication module 110 of the second communication device 200.

Figure 3:
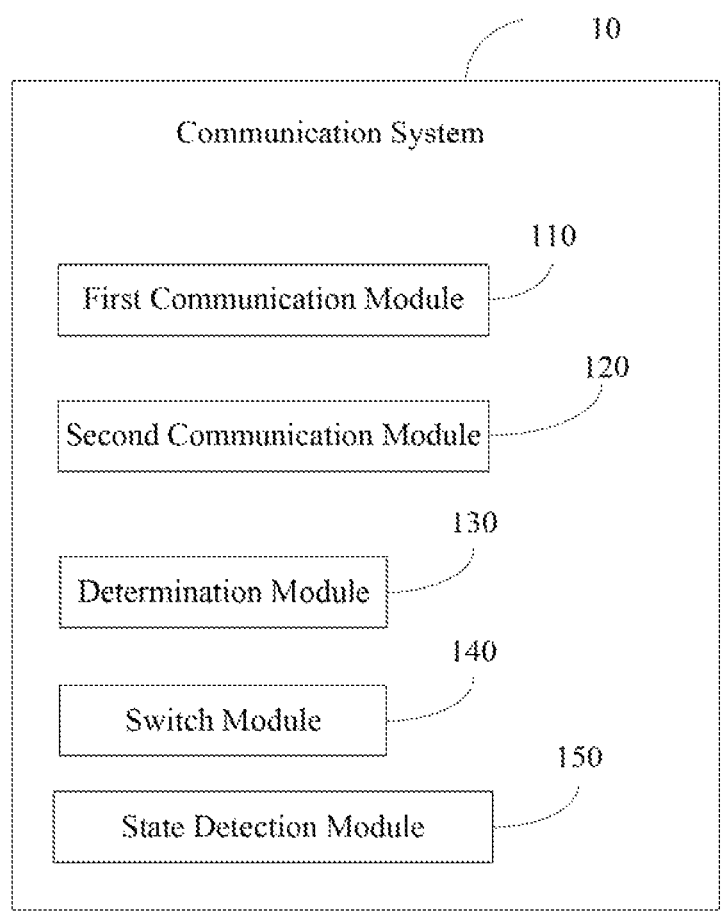
FIG. 3 is a block diagram of a second embodiment of function modules of the communication system in FIG. 1.

FIG. 3 shows a block diagram of a second embodiment of functional modules of the communication system. The communication system 10 further includes a state detection module 150. The state detection module 150 can detect a current state of the first communication module 110.

The switch module 140 exercises control by turning on or turning off the first communication module 110 according to the current state of the first communication device 100 and the current state of the first communication module 110. In the embodiment, when the determination module 130 determines the current state of the first communication device 100 as being in use, and the state detection module 150 detects the current state of the first communication module 110 as being turned off, the switch module 140 turns on the first communication module 110 of the first communication device 100, and transmit a signal to the second communication device 200 through the second communication module 120 of the first communication device 100. The second communication device 200 receives the signal and turns off its first communication module 110 in response to the received signal. In an alternative embodiment, when the determination module 130 determines the current state of the first communication device 100 as being used and the state detection module 150 detects the current state of the first communication module 110 as being turned off, the switch module 140 turns on the first communication module 110. When the determination module 130 determines the current state of the first communication device 100 as not being in use and the state detection module 150 detects that the current state of the first communication module 110 as being turned-on, the switch module 140 turns off the first communication module 110.

Figure 4:
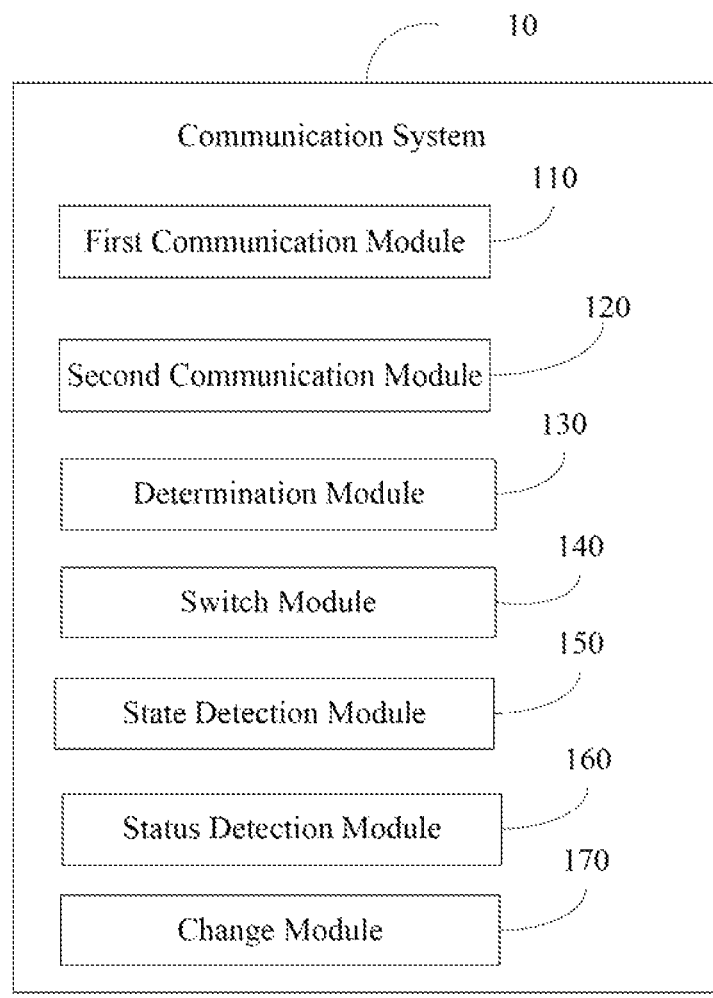
FIG. 4 is a block diagram of a third embodiment of function modules of the communication system in FIG. 1.

FIG. 4 is a block diagram of a third embodiment of function modules of the communication system. The communication system 10 further includes a status detection module 160 and a change module 170.

In the embodiment, the first communication device 100 and the one or more second communication devices 200 are each equipped with a communication card which has a single universal communication number throughout the devices 200. The first communication module 110 can establish communication between the first communication device 100 and the third communication device 300 through the communication card in the first communication device 100. Each of the communication cards has a first state and a second state and can be switched between the two states. When the communication card of the first communication device 100 is in the first state, the first communication module 110 of the first communication device 100 is in the turned-on state. When the communication card of the first communication device 100 is in the second state, the first communication module 110 of the first communication device 100 is in the turned-off state. In the same way, when the communication card of a second communication device 200 is in the first state, the communication module 110 of the second communication device 200 is in the turned-on state. When the communication card of the second communication device 200 is in the second state, the communication module 110 of the second communication device 200 is in the turned-off state. In the embodiment, the communication cards are Subscriber Identity Module (SIM) cards. The communication cards are master cards when in the first state and are slave cards when in the second state. Each time only one of the communication cards can be the master card and the others must be slave cards. For example, the first communication device 100 is a telephone, a second communication device 200 is a tablet computer having communication function, and another second communication device 200 is a wristwatch also having communication function. Each of the three communication devices has a SIM card. The three SIM cards share the same communication number. Then, when a user uses the tablet computer to play games at home, the SIM card in the tablet computer is the master card and the SIM cards in the telephone and the wristwatch are slave cards. When the user leaves his house with his mobile telephone, the SIM card in the telephone becomes the master card, and the SIM card in the tablet computer becomes a slave card.

The status detection module 160 can detect the current status of the communication card in the first communication device 100. In the embodiment, the status of the communication card are specified either by "0" or by "1" in value. The status detection module 160 determines that a communication card is the master card when the value representing the state of the communication card is "1" and determines that a communication card is a slave card when the value is "0."

The change module 170 can change the status of the communication card in the first communication device 100 according to the current state of the first communication device 100. In the embodiment, when the determination module 130 determines the current state of the first communication device 100 as being in use, the change module 170 appoints the communication card in the first communication device 100 as a master card, generates a control signal, and further transmits the control signal to the second communication devices 200 through the second communication module 120. Then the communication cards in the second communication devices 200 are appointed as slave cards by the second communication devices 200 in response to the control signal.

In an alternative embodiment, the change module 170 can appoint or demote the status of the communication card in the first communication device 100 further according to the current status of the communication card in the first communication device 100. When the current state of the first communication device 100 is being in use and the communication card in the first communication device 100 is a slave card, the change module 170 appoints the communication card in the first communication device 100 to the status of master card, generates a control signal, and further transmits the control signal to the second communication devices 200 through the second communication module 120 in the first communication device 100. Then the status of communication cards in the second communication device 200 are changed to slave by the second communication devices 200 in response to the control signal.

In another embodiment, when the current state of the first communication device 100 is not being in use and the communication card in the first communication device 100 is or was a master card, the change module 170 changes the status of communication card in the first communication device 100 to that of slave card.

The switch module 140 can turn on or turn off the first communication module 110 in the first communication device 100 according to the current status of the communication card. In the embodiment, when a communication card is the master card, the switch module 140 turns on the first communication module 110 in the first communication device 100, generates a control signal, and further transmits the control signal to the second communication devices 200 through the second communication module 120 in the first communication device 100. Then the second communication devices 200 receive the signal and turn off their first communication modules 110 in response to the received signal. In another embodiment, when the communication card is a master card, the switch module 140 turns on the first communication module 110 in the first communication device 100; when the communication card is a slave card, the switch module 140 turns off the first communication module 110 in the first communication device 100.

Figure 5:
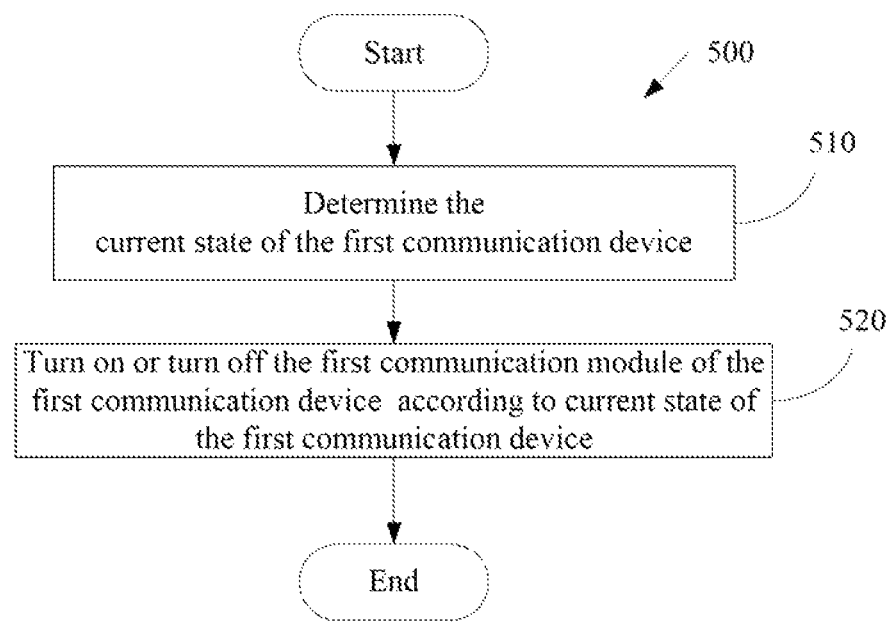
FIG. 5 is a flowchart of a first embodiment of a communications method.

Referring to FIG. 5, a flowchart is presented in accordance with an example embodiment. The example method 500 is provided by way of example, as there are a variety of ways to carry out the method. The example method 500 described below can be carried out using the configurations illustrated in FIGS. 1 and 2 for example, and various elements of these figures are referenced in explaining example method 500.

Each block shown in FIG. 5 represents one or more processes, methods, or subroutines carried out in the example method 500. Furthermore, the illustrated order of blocks is by example only and the order of the blocks can be changed. The example method 500 can begin at block 510. Depending on the embodiment, additional steps can be added, others removed, and the ordering of the steps can be changed.

At block 510, the determination module 130 determines the current state of the first communication device 100.

At block 520, the switch module 140 turns on or turns off the first communication module 110 of the first communication device 100 according to current state of the first communication device 100. In the embodiment, when the current state of the first communication device 100 is being in use, the switch module 140 turns on the first communication module 110, and transmits a control signal to the second communication device 200 through the second communication module 120, to turn off the first communication module 110 of the second communication device 200.

Figure 6:
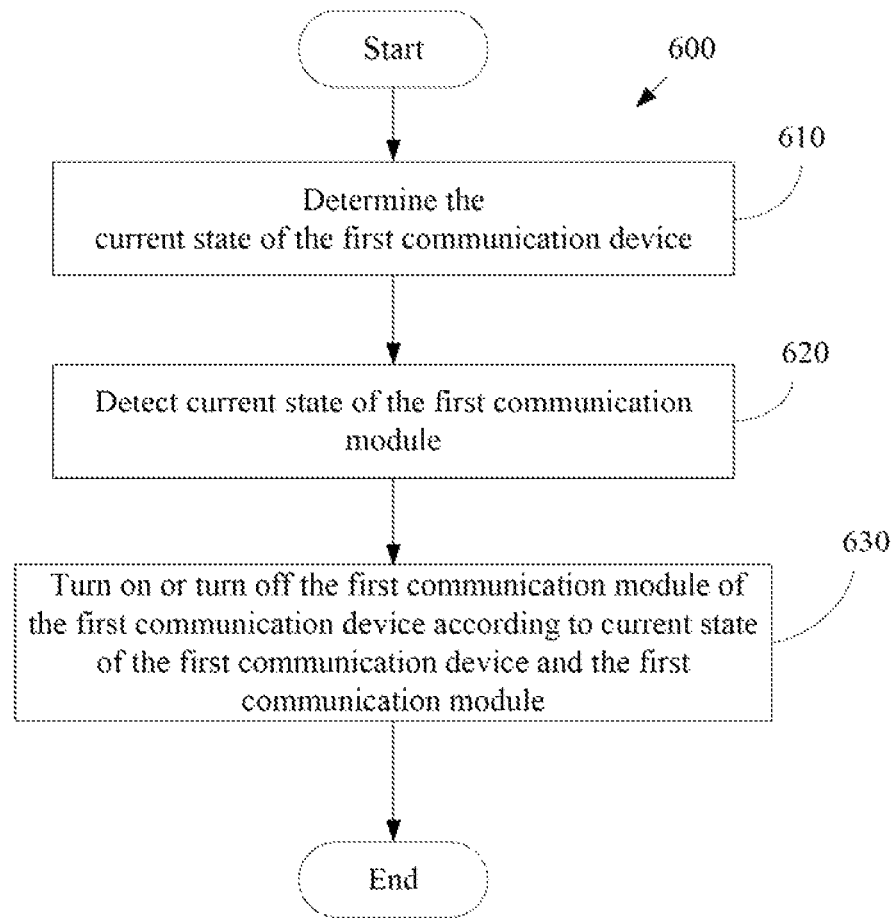
FIG. 6 is a flowchart of a second embodiment of a communications method.

Referring to FIG. 6, a flowchart of a communications method is presented in accordance with a second embodiment. The example method 600 is provided by way of example, as there are a variety of ways to carry out the method. The example method 600 described below can be carried out using the configurations illustrated in FIGS. 1 and 3 for example, and various elements of these figures are referenced in explaining example method 600. Each block shown in FIG. 6 represents one or more processes, methods, or subroutines carried out in the example method 600. Furthermore, the illustrated order of blocks is by example only and the order of the blocks can be changed. The example method 600 can begin at block 610.

At block 610, the determination module 130 determines the current state of the first communication device 100 as being in use or not being in use.

At block 620, the state detection module 150 detects current state of the first communication module 110 as being either turned-on or turned-off.

At block 630, the switch module 140 turns on or turns off the first communication module 110 of first communication device 100 the according to the current state of the first communication device 100 and the current state of the first communication module 110.

Figure 7:
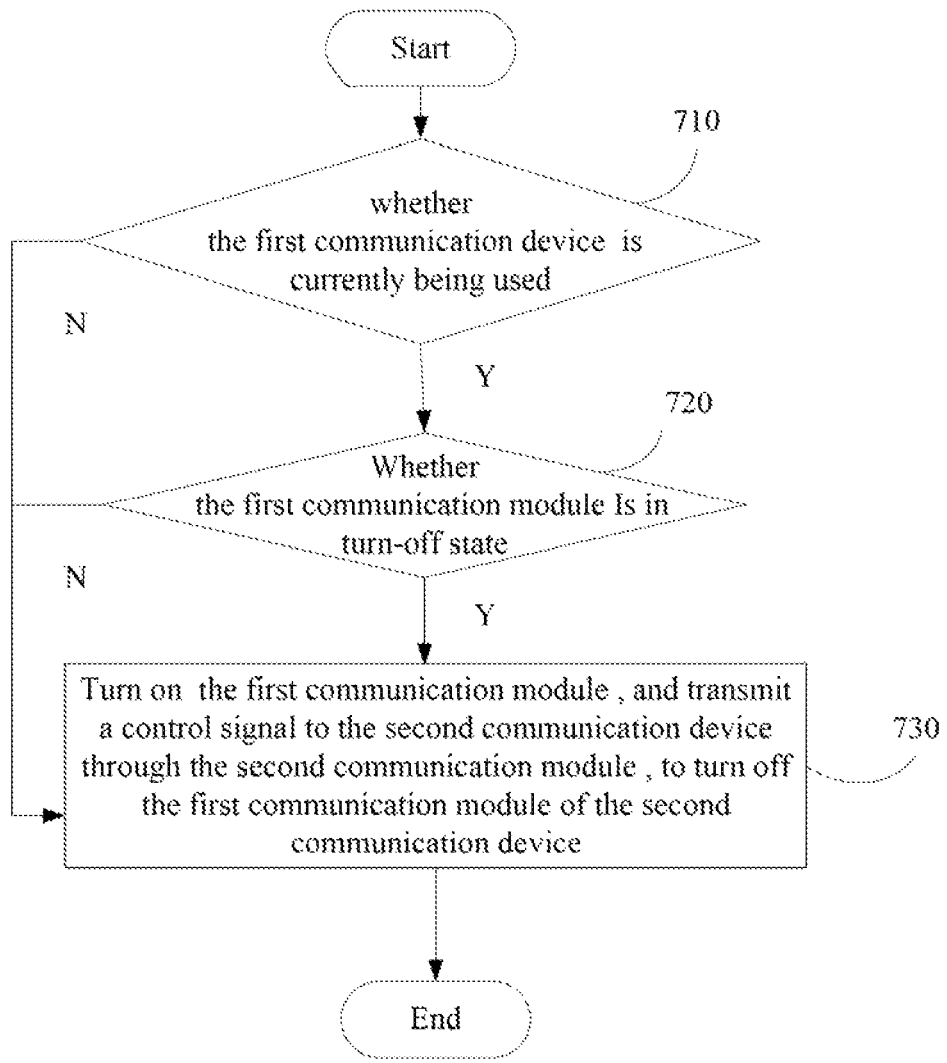
FIG. 7 is a flow chart of a detail description of an embodiment of the method in FIG. 6.

FIG. 7 illustrates a first detailed description of the method in FIG. 6.

At block 710, the determination module 130 determines the current state of the first communication device 100 as being in use or not being in use; if yes (being in use), the process goes to block 720, if no (not being in use), the process ends.

At block 720, the state detection module 150 detects whether the first communication module 110 is in turned-off state; if yes, goes to block 730, if no, the process ends.

At block 730, the switch module 140 turns on the first communication module 110 of first communication device 100. A control signal is then transmitted to the second communication device 200 through the second communication module 120, to turn off the first communication module 110 of the second communication device 200.

Figure 8:
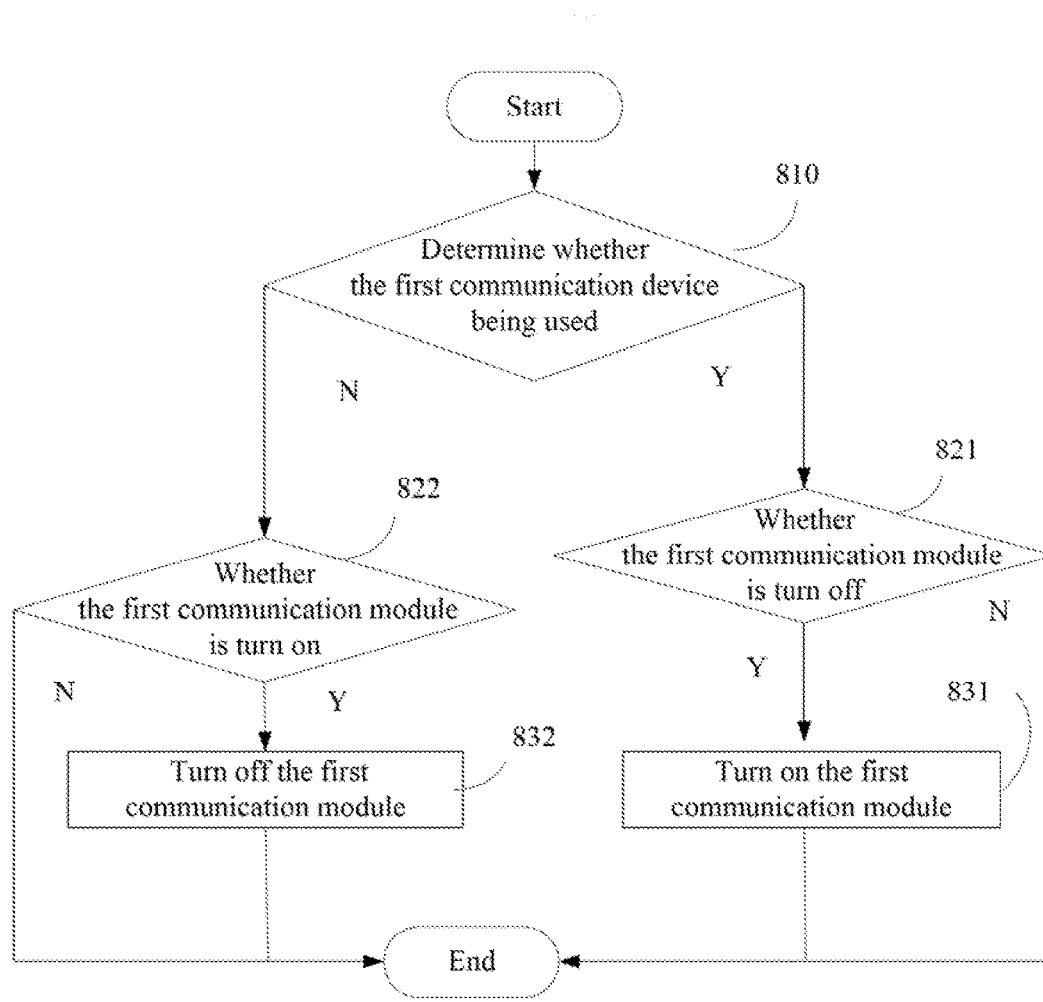
FIG. 8 is a flow chart of a detail description of an alternative embodiment of the method in FIG. 6.

FIG. 8 illustrates a second embodiment of method in FIG. 6.

At block 810, the determination module 130 determines the current state of the first communication device 100 as being in use or not being in use; if yes (being in use), the process goes to block 821, if no (not being in use), the process goes to block 822.

At block 821, the state detection module 150 detects whether the first communication module 110 is in turned-off state; if yes, the process goes to block 831, if no, the process ends.

At block 822, the state detection module 150 detects whether the first communication module 110 is in turned-on state; if yes, the process goes to block 832, if no, the process ends.

At block 831, the switch module 140 turns on the first communication module 110 of first communication device 100.

At block 832, the switch module 140 turns off the first communication module 110 of first communication device 100.

Figure 9:
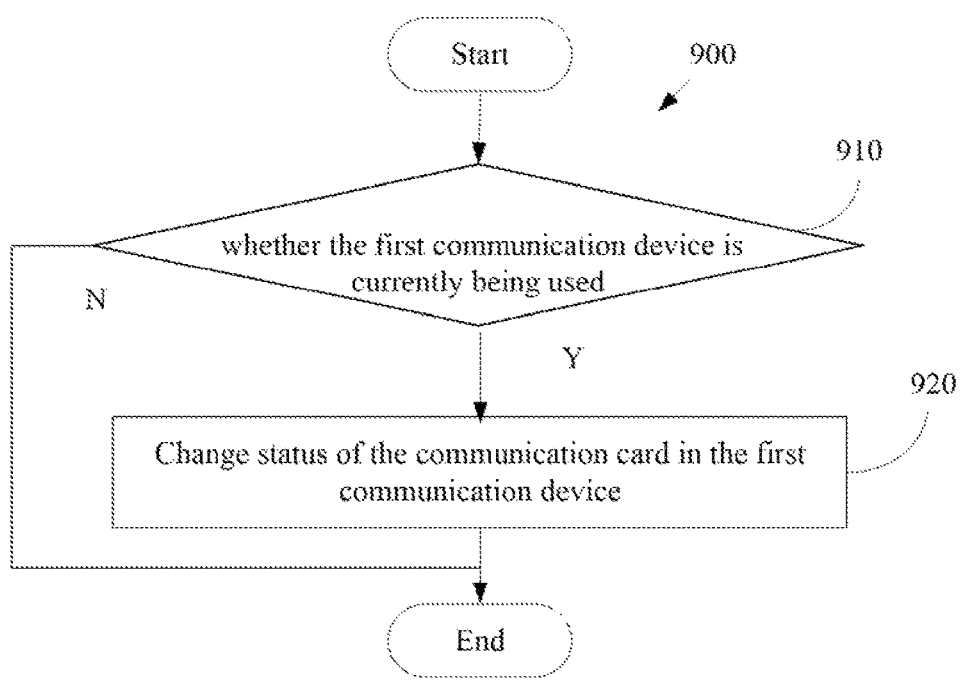
FIG. 9 is a flowchart of a third embodiment of a communications method.

Referring to FIG. 9, a flowchart of a communications method is presented in accordance with a third embodiment. The example method 900 is provided by way of example, as there are a variety of ways to carry out the method. The example method 900 described below can be carried out using the configurations illustrated in FIGS. 1 and 4 for example, and various elements of these figures are referenced in explaining example method 900. Each block shown in FIG. 9 represents one or more processes, methods, or subroutines carried out in the example method 900. Furthermore, the illustrated order of blocks is by example only and the order of the blocks can be changed. The example method 900 can begin at block 910.

At block 910, the determination module 130 determines the current state of the first communication device 100 as being used or not being used; if yes (being used), the process goes to block 920, if no (not being used), the process ends.

At block 920, the change module 170 changes the status of the communication card in the first communication device 100. In the embodiment, the change module 170 changes the status of the communication card in the first communication device 100 to that of master card, and generates and transmits a control signal to the second communication device 200 through the second communication module 120, to turned off the first communication module 110 of the second communication device 200.

Figure 10:
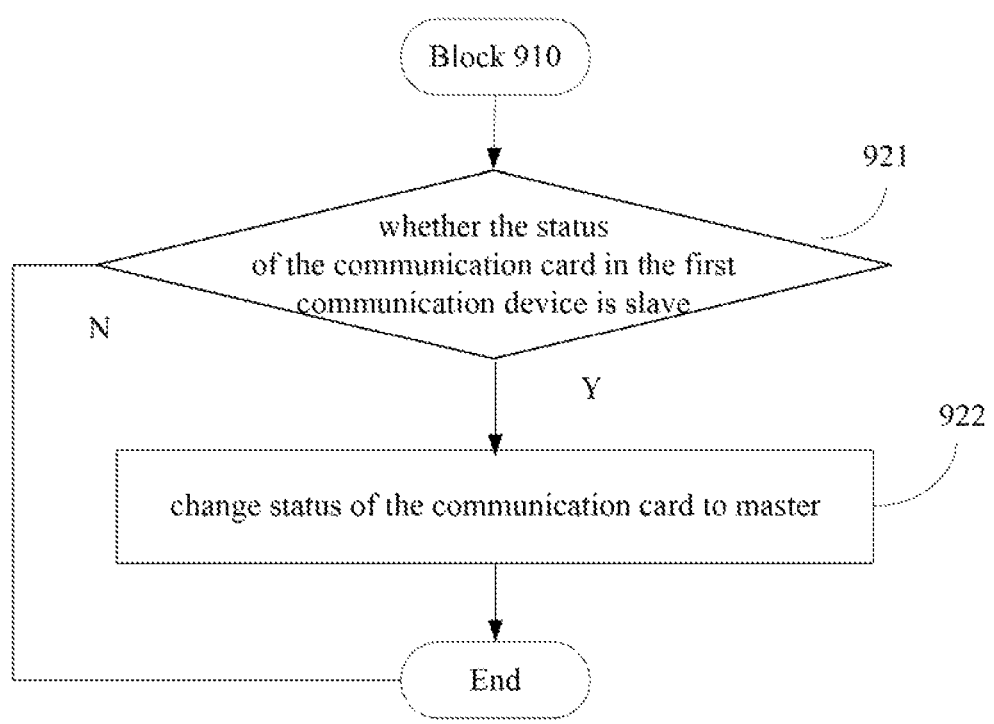
FIG. 10 is a flow chart of a detail description of one embodiment of block 920 in FIG. 9.

FIG. 10 gives a detailed description of one embodiment of block 920 in FIG. 9.

At block 921, the status detection module 160 detects whether the communication card in the first communication device 100 is a slave card, if yes, the process goes to block 922, if no, the process ends.

At block 922, the change module 170 changes the status of the communication card in the first communication device 100 to that of master card. The change module 170 further generates and transmits a control signal to the second communication devices 200 through the second communication module 120, to change the status of the communication cards in the second communication devices 200 to that of slave cards.

Figure 11:
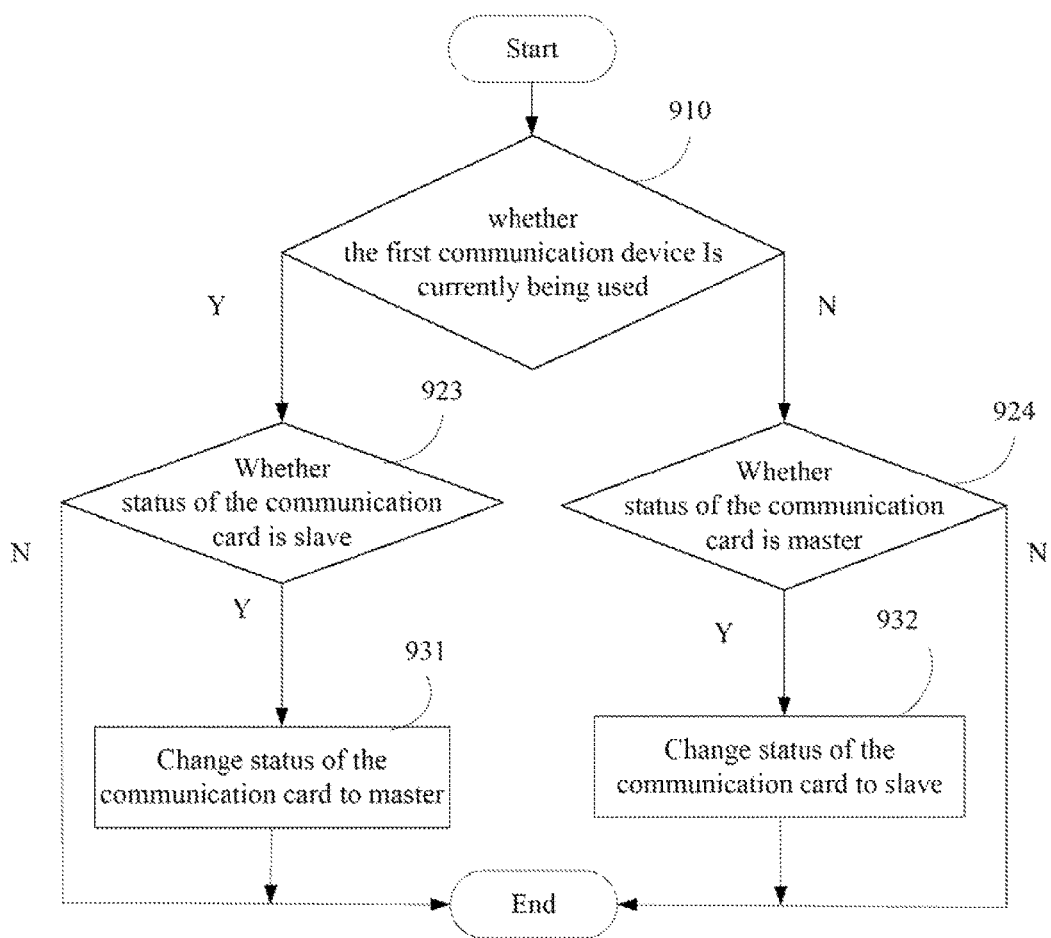
FIG. 11 is a flow chart of a detail description of an alternative embodiment of block 920 in FIG. 9.

FIG. 11 gives a detailed description of an alternative embodiment of block 920 in FIG. 9.

At block 910, the determination module 130 determines whether the current state of the first communication device 100 is being used; if yes, the process goes to block 923, if no, the process goes to block 924.

At block 923, the status detection module 160 detects whether the communication card in the first communication device 100 is a slave card; if yes, the process goes to block 931, if no, the process ends.

At block 924, the status detection module 160 detects whether the communication card in the first communication device 100 is a master card; if yes, the process goes to block 932, if no, the process ends.

At block 931, the change module 170 changes the status of the communication card in the first communication device 100 to that of master card.

At block 932, the change module 170 changes the status of the communication card in the first communication device 100 to that of slave card.

It should be emphasized that the above-described embodiments of the present disclosure, including any particular embodiments, are merely possible examples of implementations, set forth for a clear understanding of the principles of the disclosure.

Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A first communication device comprising:
   a first communication unit configured to communicate with an external device;
   at least one processor coupled to the first communication unit; and
   a storage device coupled to the at least one processor, and storing one or more programs which, when executed by the at least one processor, cause the at least one processor to:
   determine a current state of the first communication device by detecting whether at least one user operation is applied on the first communication device;
   alternatively activate or deactivate the first communication unit based on the current state;
   wherein the first communication device further comprises:
   a communication card, comprising a master status and a slave status, wherein the first communication unit is activated when the status of the communication card is master, and the first communication unit is deactivated when the status of the communication card is slave;

wherein the at least one processor is further caused to:

detect a current status of the communication card; and activate or deactivate the first communication unit based on the current status of the communication card and the current state of the first communication device;

wherein the status of the communication card is changed to master, and a control signal is generated by the first communication device and transmitted to second communication devices to change statuses of communication cards of the second communication devices to slave; when the first communication device is currently being used and the current status of the communication card is slave.

2. A communications method being executed by at least one processor of a first communication device, the first communication device communicating with an external device through a first communication unit, the method comprising:

determining a current state of the first communication device by detecting whether at least one user operation is applied on the first communication device; and alternatively activate or deactivate the first communication unit based on the current state;

wherein the first communication device is configured to communicate and share a same communication number with one or more second communication devices;

the method further comprising:

activating the first communication unit;

generating a control signal; and transmitting the control signal to the second communication devices to deactivate first communication units of the second communication devices when the first communication device is currently being used;

wherein the method further comprises:

equipping a communication card in the first communication device, the communication card comprising a master status and a slave status, wherein the first communication unit is activated when status of the communication card is master, and the first communication unit is deactivated when status of the communication card is slave; and changing the status of the communication card based on the current state of the first communication device;

wherein the method further comprises:

changing the status of the communication card to master, generating a control signal; and transmitting the control signal to the second communication devices to change statuses of communication cards of the second communication devices to slave; when the first communication device is currently being used.

* * * * *